(12) United States Patent
Yamawaki et al.

(10) Patent No.: US 6,489,552 B2
(45) Date of Patent: Dec. 3, 2002

(54) PHOTOVOLTAIC CELL MODULE TILE

(75) Inventors: Takeharu Yamawaki, Moriyama (JP); Teruki Hatsukaiwa, Otsu (JP); Fumihiro Tanigawa, Settsu (JP); Isao Yoshida, Tokushima (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/998,886

(22) Filed: Nov. 19, 2001

(65) Prior Publication Data

US 2002/0036010 A1 Mar. 28, 2002

Related U.S. Application Data

(63) Continuation of application No. PCT/JP00/03760, filed on Jun. 9, 2000.

(30) Foreign Application Priority Data

| Jun. 9, 1999 | (JP) | 11-162352 |
| Jun. 9, 1999 | (JP) | 11-162353 |
| Aug. 6, 1999 | (JP) | 11-223850 |
| Sep. 20, 1999 | (JP) | 11-265283 |
| Sep. 21, 1999 | (JP) | 11-266900 |

(51) Int. Cl.⁷ ................ H01L 31/04; H01L 31/048; E04D 1/30; E04D 3/40
(52) U.S. Cl. ............... 136/251; 136/291; 136/244; 52/173.3; 52/519; 52/522
(58) Field of Search .............. 136/251, 291, 136/244; 52/173.3, 519, 522

(56) References Cited

U.S. PATENT DOCUMENTS 5,768,831 A * 6/1998 Melchior .................. 52/173.3
6,105,316 A * 8/2000 Bottger et al. ............. 52/173.3
6,294,724 B1 * 9/2001 Sasaoka et al. ............. 136/251

FOREIGN PATENT DOCUMENTS

| DE | 4332873 A1 | * 3/1995 |
| EP | 1071137 A2 | * 1/2001 |
| EP | 1071138 A2 | * 1/2001 |
| JP | 62-52610 | 4/1987 |
| JP | 1-148417 | 10/1989 |
| JP | 4-28524 | 3/1992 |
| JP | 5-3430 | 1/1993 |
| JP | 10-018514 | 1/1998 |
| JP | 10-018515 | 1/1998 |
| JP | 10-037405 | 2/1998 |
| JP | 10-088739 | 4/1998 |
| JP | 10-088741 | 4/1998 |
| JP | 10-093127 | 4/1998 |
| JP | 11-006255 | 1/1999 |
| JP | 2000-64510 A | * 2/2000 |

* cited by examiner

*Primary Examiner*—Alan Diamond
(74) *Attorney, Agent, or Firm*—Hogan & Hartson, LLP

(57) ABSTRACT

A photovoltaic cell module tile that includes a tile body, a recess, a fitting section, and a pressure member. The recess is provided in a top surface of the tile body, which stores a photovoltaic cell module. The fitting section is provided in the recess on an eaves side of the tile body. An eaves-side end portion of the photovoltaic cell module is inserted and fitted in the fitting section. The pressure member is provided on a ridge side of the tile body and presses a ridge-side end portion of the photovoltaic cell module against the tile body.

21 Claims, 12 Drawing Sheets

PHOTOVOLTAIC CELL MODULE TILE

CROSS-REFERENCE TO RELATED APPLICATIONS

This is a Continuation Application of PCT Application No. PCT/JP00/03760, filed Jun. 9, 2000, which was not published under PCT Article 21(2) in English.

This application is based upon and claims the benefit of priority from the prior Japanese Patent Applications No. 11-162352, filed Jun. 9, 1999, No. 11-162353, filed Jun. 9, 1999, No. 11-223850, filed Aug. 6, 1999, No. 11-265283, filed Sep. 20, 1999; and No. 11-266900, filed Sep. 21, 1999, the entire contents of all of which are incorporated herein by reference.

BACKGROUND OF THE INVENTION

1. Field of the Invention

This invention relates to a photovoltaic cell module tile which is used as roofing material of buildings and on which a photovoltaic cell module is mounted.

2. Description of the Related Art

The technique of mounting a solar battery on a tile used as roofing material of buildings and converting solar energy into electricity is known in Jpn. UM Appln. KOKAI Publications Nos. 62-52610, 1-148417, 4-28524, 5-3430, etc.

Jpn. UM Appln. KOKAI Publication No. 62-52610 discloses that a recess whose shape conforms to that of a solar battery is formed in the top surface of exterior material dedicated to tiles and outer walls and the solar battery is fitted into the recess.

Jpn. UM Appln. KOKAI Publication No. 1-148417 discloses that a solar battery is provided on the undersurface of a flat-plate tile and a lead of the solar battery is drawn from a space formed under the upper edges of the flat-plate tile.

Jpn. UM Appln. KOKAI Publication No. 5-3430 discloses that a solar battery is adhered to the surface of a tile, an opaque sheet is stuck to the surface of the solar battery such that it can be peeled therefrom, and the solar battery is protected by the sheet in a tiling operation.

In the prior art solar-battery mounted tile as described above, a solar battery is directly adhered to a tile body by an adhesive, a recess is formed in the tile body, the solar battery is adhered to the bottom of the recess through the adhesive, and the solar battery is fixed into the recess by filling a gap between the solar battery and the inner surface of the recess with caulking materials.

However, the adhesive and caulking materials are easy to deteriorate. In a roof that is exposed to sunlight and increased in temperature and exposed to the weather, the deterioration makes rapid progress to cause a crack, which rainwater is easy to enter. When the roof has a steep pitch, the solar battery is likely to drop from the tile body. Further, when the caulking materials are squeezed out and adhered to the surface of the solar battery, a problem of decreasing photoelectric conversion efficiency occurs.

In the tile having a recess on its surface to which a solar battery is adhered as disclosed in the foregoing Jpn. UM Appln. KOKAI Publications Nos. 62-52610 and 4-28524, rainwater is collected at the bottom of the recess and the collected rainwater is heated and expanded by solar heat, with the result that the solar battery is likely to rise..

In the prior art wherein a lead of the solar battery is drawn from a portion of the undersurface of the upper edges of the flat-plate tile where a space is to be formed as disclosed in Jpn. UM Appln. KOKAI Publication No. 1-148417, a wiring operation is difficult to perform, and the entry of rainwater is likely to cause a short circuit and a leak of electricity. Even though an operator is going to replace one tile together with the solar battery, he or she has to perform a difficult operation of removing several tiles around the one tile. Jpn. UM Appln. KOKAI Publication No. 5-3430 discloses a structure in which the solar battery is likely to separate and drop from the tile when the adhesive deteriorates.

In all of the publications described above, the photovoltaic cell module is fixed to the tile body by the adhesive. Thus, when an operator is going to replace one photovoltaic cell module to maintain and inspect the module or when it is broken, he or she is difficult to separate the tile body and the photovoltaic cell module from each other because they are formed integrally as one component and thus needs to replace the module together with the tile body.

Accordingly, an object of the invention is to provide a high-reliability tile for a photovoltaic cell module in which the photovoltaic cell module is detachably fixed to a tile body and one photovoltaic cell module can easily be replaced when it is broken, and the photovoltaic cell module can easily and reliably fixed to the tile body.

BRIEF SUMMARY OF THE INVENTION

A photovoltaic cell module tile according to the present invention includes a recess provided in a top surface of the tile body, which stores a photovoltaic cell module, and a fitting section which is provided in the recess on an eaves side of the tile body and in which an eaves-side end portion of the photovoltaic cell module is inserted and fitted. A pressure member is provided on a ridge side of the tile body and presses a ridge-side end portion of the photovoltaic cell module against the tile body.

A photovoltaic cell module tile according to the present invention includes a mounting section provided on a tile body, which mounts a photovoltaic cell module having a terminal box on an undersurface of the photovoltaic cell module. A tightening member provided in the terminal box penetrates the mounting section of the tile body and fixes the photovoltaic cell module to the tile body from under the mounting section. The tightening member has a nut and a bolt.

A photovoltaic cell module tile according to the present invention includes a mounting section provided on a tile body, which mounts a photovoltaic cell module having a terminal box on an undersurface of the photovoltaic cell module. The photovoltaic cell module also includes a tightening member for fixing the photovoltaic cell module to the tile body. The tightening member has a fixing member body interposed between adjacent tile bodies of a plurality of tile bodies arranged in a row, a pressure piece which is formed on an upper end portion of the fixing member body to be integral with the fixing member body and presses photovoltaic cell modules of adjacent tile bodies against the tile bodies, and a holding piece which is formed on a lower end portion of the fixing member body to be integral with the fixing member body and holds under the tile body.

A photovoltaic cell module tile according to the present invention includes a mounting section provided on a tile body, which mounts a photovoltaic cell module having a terminal box on an undersurface of the photovoltaic cell module. The photovoltaic cell module also includes a tightening member for fixing the photovoltaic cell module to the tile body. The tightening member has a fixing member body interposed between adjacent ones of a plurality of tile bodies arranged in a row, a pair of left and right pressure pieces which are formed on an upper end portion of the fixing member body to be integral with the fixing member body and are each connected to a top surface of the photovoltaic cell module mounted on a corresponding one of the plurality of tile bodies to press the photovoltaic cell module against the tile body, and a holding piece which is fomed on a lower end portion of the fixing member body to be integral with the fixing member body and holds, together with the pair of pressure pieces, the tile body.

DETAILED DESCRIPTION OF THE INVENTION

Embodiments of the invention will now be described based on the drawings.

Figure 1:
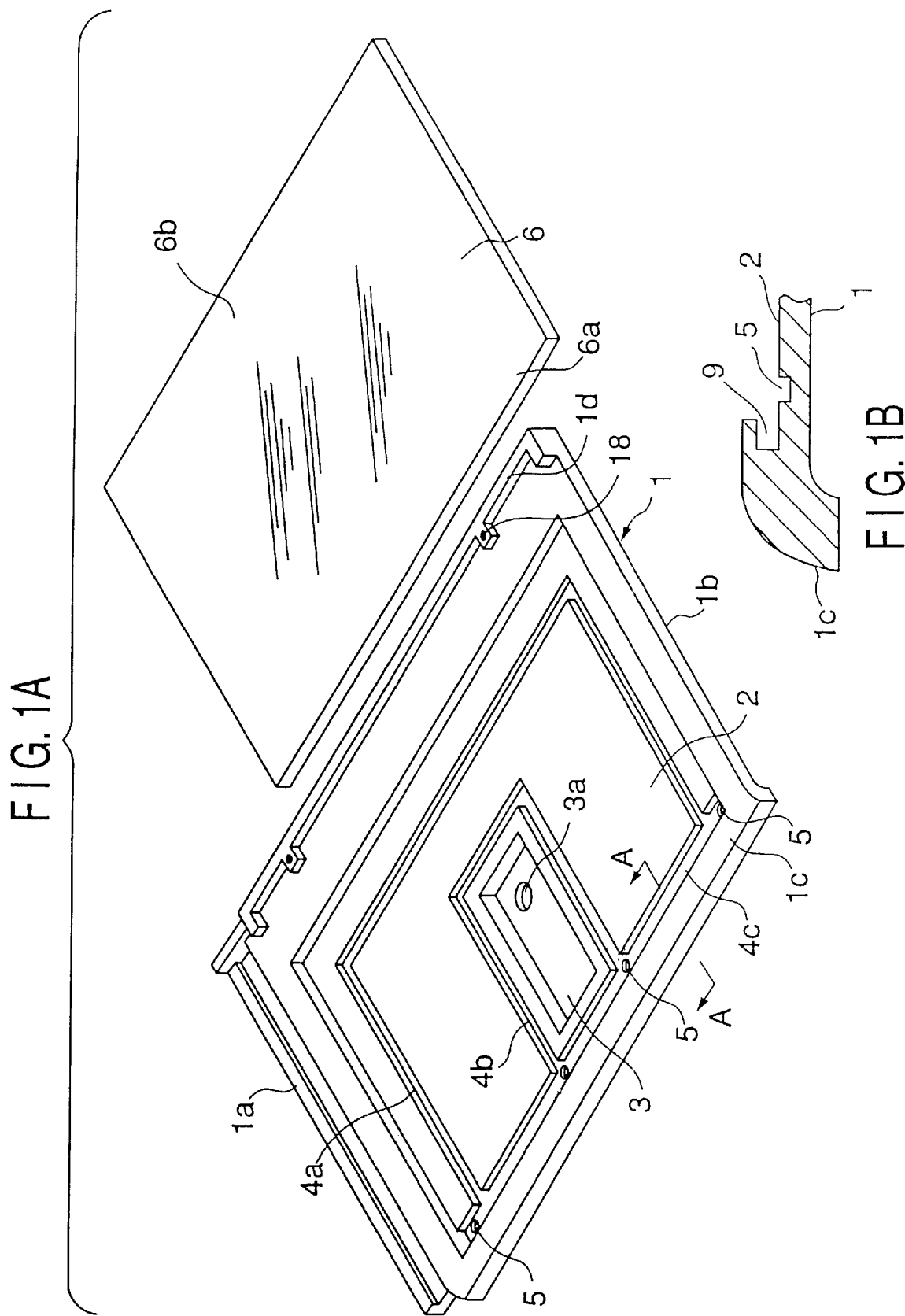
FIG. 1A is a perspective view of a photovoltaic cell module tile according to a first embodiment of the invention.
FIG. 1B is a cross-sectional view taken along line A—A of FIG. 1A.
Figure 2:
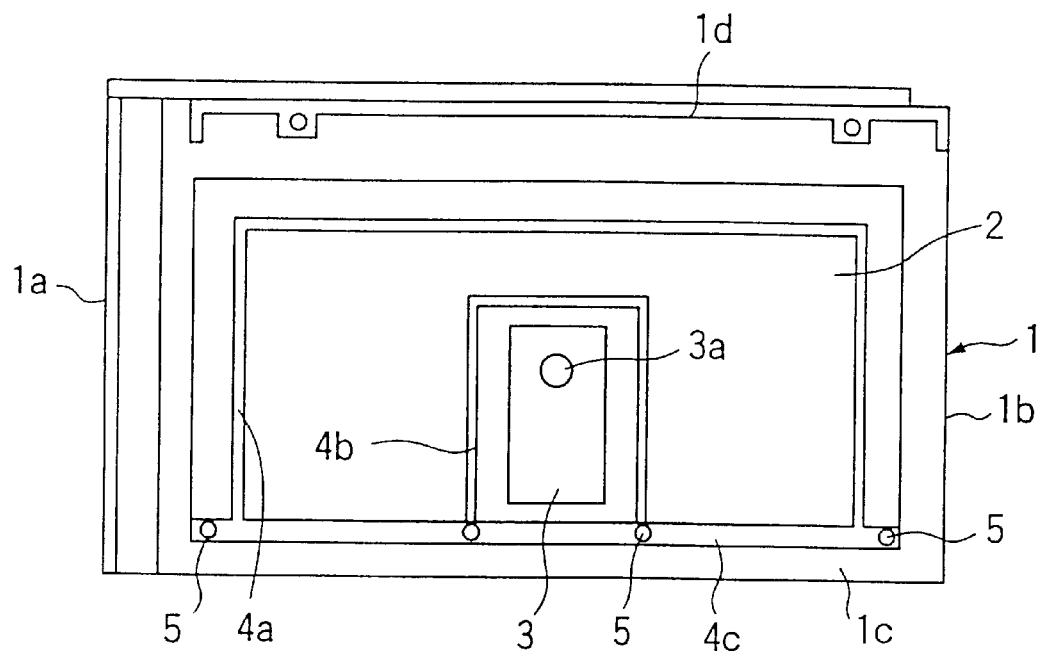
FIG. 2 is a plan view of a tile body according to the first embodiment.
Figure 3:
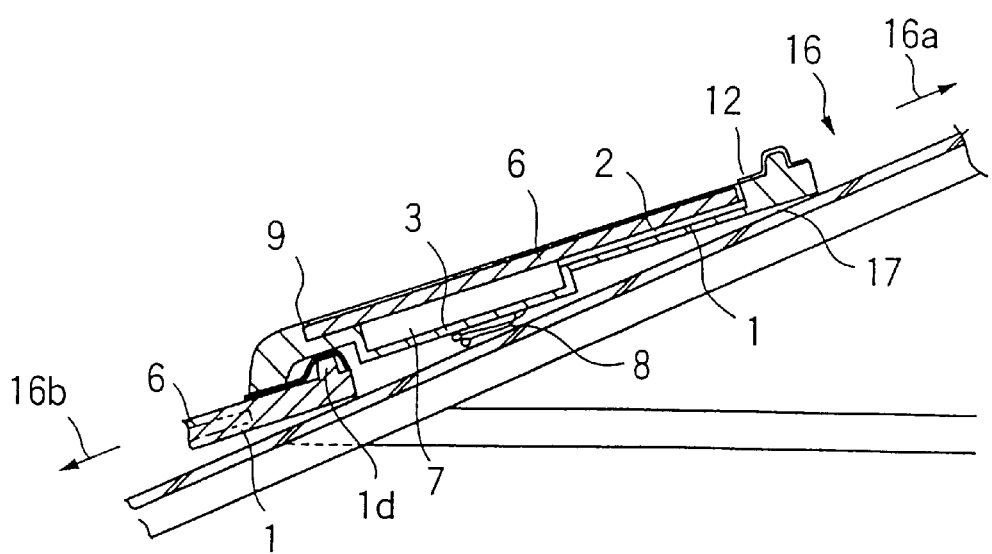
FIG. 3 is a vertical side view showing a tiling state of the photovoltaic cell module tile according to the first embodiment.
Figure 4:
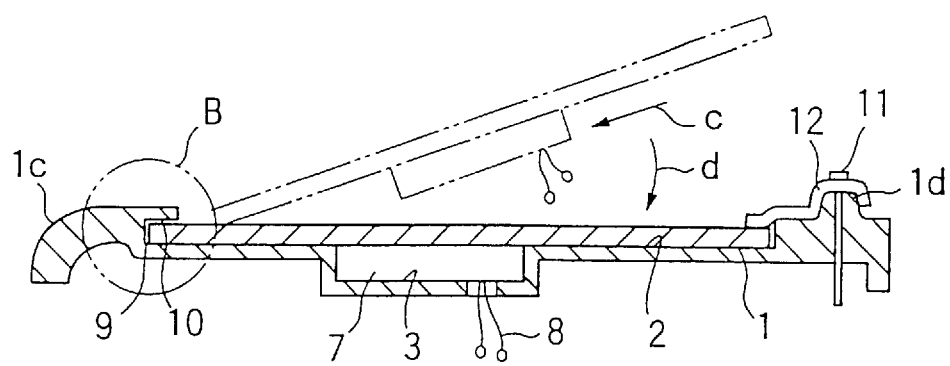
FIG. 4 is a vertical side view of the photovoltaic cell module tile according to the first embodiment.
Figure 5:
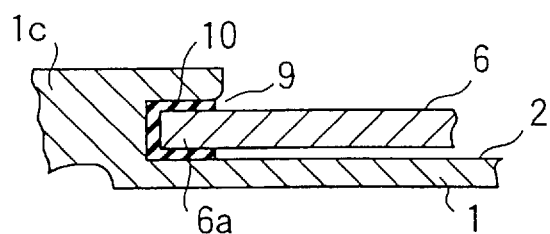
FIG. 5 is an enlarged cross-sectional view of portion A of FIG. 4.

FIGS. 1 to 5 show a first embodiment. FIG. 1A is a perspective view of a photovoltaic cell module tile, FIG. 1B is a cross-sectional view taken along line A—A of FIG. 1A, FIG. 2 is a plan view of a tile body, FIG. 3 is a vertical side view showing a tiling state of the photovoltaic cell module tile, FIG. 4 is a vertical side view of the photovoltaic cell module tile, and FIG. 5 is an enlarged cross-sectional view of portion B of FIG. 4.

As FIGS. 1A, 1B and 2 show, the tile body 1 is formed like a rectangular flat plate by synthetic resin materials, cement and the like. Overlap portions 1a and 1b, which are fitted to their adjacent tile body 1 in male-and-female relation, are provided on both sides or right and left sides of the tile body 1. A front hanging portion 1c is provided on the undersurface of a lower end portion, while a rear rising portion 1d is provided on the surface of an upper end portion. The front hanging portion 1c is put on the top surface of the tile body 1 on the lower side, while the rear rising portion 1d is put on the undersurface of the tile body 1 on the upper end side.

A rectangular recess 2 is formed substantially all over the tile body 1. The recess 2 is formed slightly deeper than a photovoltaic cell module that will be described later, and a rectangular terminal-box storing recess 3 is formed substantially in the central part of the recess 2. A cable lead-out hole 3a is formed in that position of the bottom of the terminal-box storing recess 3 which is biased toward the upper end portion of the tile body 1. Further, the undersurface of the terminal-box storing recess 3 is formed substantially flush with the front hanging portion 1c of the tile body 1 and thus the tile body 1 can stably be placed on a roof.

A first drain 4a is continuously formed like a Japanese letter "⊐" along the upper side and both the sides of the recess 2 on the bottom of the recess 2. A second drain 4b is also continuously formed like a Japanese letter "⊐" so as to surround the terminal-box storing recess 3 in the central part of the bottom of the recess 2. Furthermore, a third drain 4c is formed along the whole length of the lower side of the recess 2, and the first and second drains 4a and 4b communicate with the third drain 4c. In other words, water flowing through the first and second drains 4a and 4b is collected in the third drain 4c.

A drain hole 5 is formed as a through-hole in each 25 of four portions including both end portions of the third drain 4c and merging portions of the second and third drains 4b and 4c. These drain holes 5 are formed through the tile body 1.

Moreover, a fitting section 9 having an undercut recess groove whose section is shaped like a Japanese letter "⊐", is provided in the front hanging portion 1c of the tile body 1 continuously from the recess 2. The fitting section 9 has a height dimension that is slightly greater than the thickness of a photovoltaic cell module 6 that will be described later, and an eaves-side end portion 6a of the photovoltaic cell module 6 can be inserted and fitted thereinto.

The recess 2 of the tile body 1 configured as described above is formed to the size conforming to the dimension of the photovoltaic cell module 6, and the photovoltaic cell module 6 is stored in the recess 2. The photovoltaic cell module 6 is obtained by forming a transparent electrode layer, an amorphous semiconductor layer, and an undersurface electrode layer on a single glass substrate. A rectangular thin-plate panel structure that is sealed by a sealing member for insulation, waterproofing, etc. can be formed on the undersurface of the photovoltaic cell module. An amorphous semiconductor layer is favorably used as the semiconductor layer. However, the semiconductor layer is not limited to the amorphous semiconductor layer but can be a semiconductor layer of single crystal, polycrystal, micro-crystal, a silicon type, or a compound type.

As illustrated in FIGS. 3 and 4, a terminal box 7 is fixed to substantially the central part of the undersurface of the photovoltaic cell module 6, and an output producing cable 8 is connected to the terminal-box 7. The terminal box 7 is stored in the terminal-box storing recess 3 of the tile body 1, and the output producing cable 8 is lead out of the cable lead-out hole 3a toward the underside of the tile body 1.

The photovoltaic cell module 6 is fixed into the recess 2 of the tile body 1 as illustrated in FIGS. 4 and 5. In other words, packing 10 that is made of rubber or synthetic resin is fitted to the fitting section 9 of the tile body 1, and the eaves-side end portion 6a of the photovoltaic cell module 6 is fitted to the fitting section 9 through the packing 10. In this case, as indicated by a two-dot-one-dash line in FIG. 4, the photovoltaic cell module 6 is diagonally inserted in the direction of arrow c. After insertion, a ridge-side end portion 6b of the photovoltaic cell module 6 is depressed in the direction of arrow d and thus the whole of the photovoltaic cell module 6 can be stored in the recess 2.

The ridge-side end portion 6b of the photovoltaic cell module 6 is fixed to the rear rising portion 1d of the tile body 1 by a pressure member 12 fixed by a tile fixing nail 11. The pressure member 12 includes the same material as that of the tile body 1. In other words, the tile is divided into two pieces of the tile body 1 and the pressure member 12, and the ridge-side end portion 6b of the photovoltaic cell module 6 can be pressed and fixed on the tile body 1 by fixing the pressure member 12 by the tile fixing nail 11.

A so-called tiling operation of tiling the roof of a building using photovoltaic cell module tiles configured as described above will now be described. As FIG. 3 shows, a roof 16 is provided with a roofing board 17 that is tilted from the ridge side 16a toward the eaves side 16b, and the photovoltaic cell module tiles are placed on the roofing board 17 directly or through a tile underlying member.

As in the normal tiling operation, photovoltaic cell module tiles are sequentially placed on the roofing board 17 from the eaves side 16b toward the ridge side 16a. Adjacent side-to-side tile bodies 1 are fitted to each other by connecting their overlap portions 1a and 1b in male-and-female relation. The tile is fixed to the roofing board 17 by passing a nail through a mounting hole 18 (see FIGS. 1 and 2) formed in the upper end portion of the tile body 1. Further, the front hanging portion 1c of the tile body 1 on the upper side overlaps the top of the rear rising portion 1d thereof on the lower side, and the drain hole 5 of the tile body 1 on the upper side is located below the rear rising portion 1d of the tile body 1 on the lower side (the eaves side 16b). Similarly, the tile body 1 on the upper side is fixed to the roofing board 17 by passing the tile fixing nail 11 through the mounting hole 18.

By repeating the same method as described above, the roof 16 can be formed by the photovoltaic cell module tiles. The output producing cables 8 lead out of the terminal box 7 are connected in series or parallel to each other simultaneously with the tiling operation, with the result that a plurality of photovoltaic cell modules 6 can electrically be connected to each other.

According to the present embodiment, the photovoltaic cell module 6 can be inserted and fixed into the fitting section 9 of the tile body 1 and, unlike in the prior art, the photovoltaic cell module 6 need not be fixed to the tile body 1 by an adhesive. Consequently, an operation of fixing the photovoltaic cell module 6 to the tile body 1 is facilitated and the possibility that the photovoltaic cell module 6 is peeled and dropped from the tile body 1 due to degradation in adhesive is eliminated.

Since, moreover, the photovoltaic cell module 6 is fitted and fixed to the tile body 1 without using any adhesive, the following advantage is obtained. When one or some of a number of photovoltaic cell modules 6 laid on the roof 16 is broken and needs to be replaced, the tile fixing nail 11 that fixes the pressure member 12 that fixes the photovoltaic cell module 6 is pulled out, thereby detaching the photovoltaic cell module 6 from the tile body 1 and replacing it with a new photovoltaic cell module 6.

Figure 6:
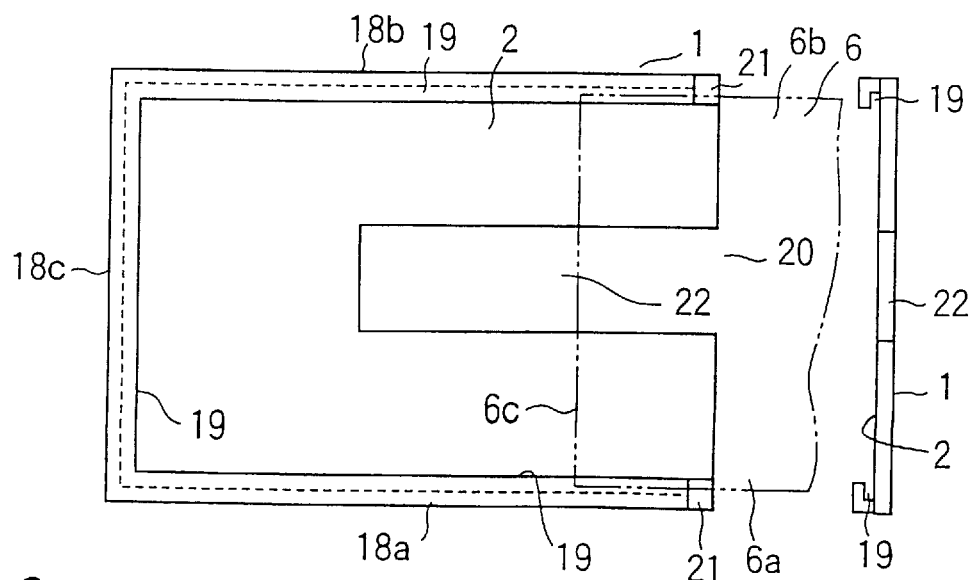
FIG. 6 is a schematic plan view and a right-hand side view of a photovoltaic cell module tile according to a second embodiment of the invention.
Figure 7:
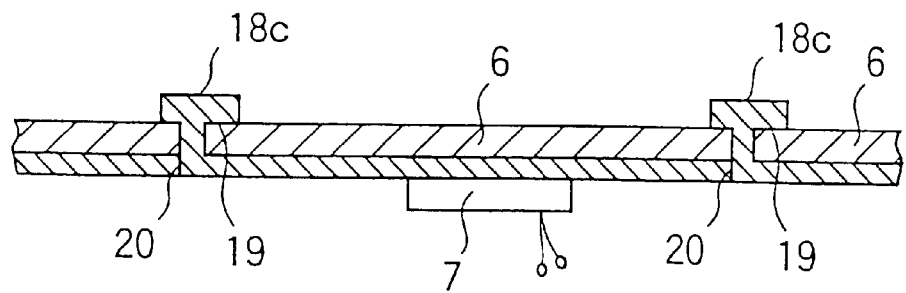
FIG. 7 is a vertical front view showing part of a laying state of the photovoltaic cell module tile according to the second embodiment.

FIGS. 6 and 7 illustrate a second embodiment, and the same components as those of the first embodiment are indicated by the same numbers and their descriptions are omitted. In the second embodiment, projections 18a, 18b and 18c are continuously formed on the lower, upper and left-side edges of the tile body 1. A fitting section 19 having a recess groove shaped like a Japanese letter "⊐" is provided on the inner sides of the projections 18a, 18b and 18c continuously with a recess 2, and an open inserting section 20 for inserting a photovoltaic cell module 6 is formed on the right-side edge of the tile body. Further, a notch portion 21 is provided at an end portion of each of the projections 18a and 18b of the lower and upper edges of the tile body 1, which are located close to the inserting section 20. Moreover, an escape section 22 for a terminal box, which is formed of a notch portion opened continuously from the inserting section 20, is provided in the recess 2 of the tile body 1.

According to the present embodiment, since the fitting section 19 is formed on three sides of the tile body 1, the left end portion of the photovoltaic cell module 6 is positioned in the inserting section 20, and the eaves-side end portion 6a and ridge-side end portion 6b of the photovoltaic cell module 6 are inserted into the fitting section 19. If the photo voltaic cell module 6 is slid in the left direction, the terminal box 7 of the photovoltaic cell module 6 is fixed into the escape section 22, and three sides of the eaves-side end portion 6a, ridge-side end portion 6b, and left-side end portion 6c are fitted and fixed to the fitting section 19 of the tile body 1.

As described above, the photovoltaic cell module 6 is fixed to the tile body 1 and then the photovoltaic cell module tiles are sequentially placed on the roofing board 17 from the ridge-side end portion 6b toward the eaves-side end portion 6a as in the normal tiling operation. In the tile bodies 1 adjacent from side to side, however, the projection 18c on the left-side edge portion of the tile body 1 closes the inserting section 20 of the tile body and fixed to the notch portion 21. Consequently, the tile bodies 1 adjacent from side to right overlap each other to allow rainwater to be prevented from entering, as illustrated in FIG. 7.

Figure 8:
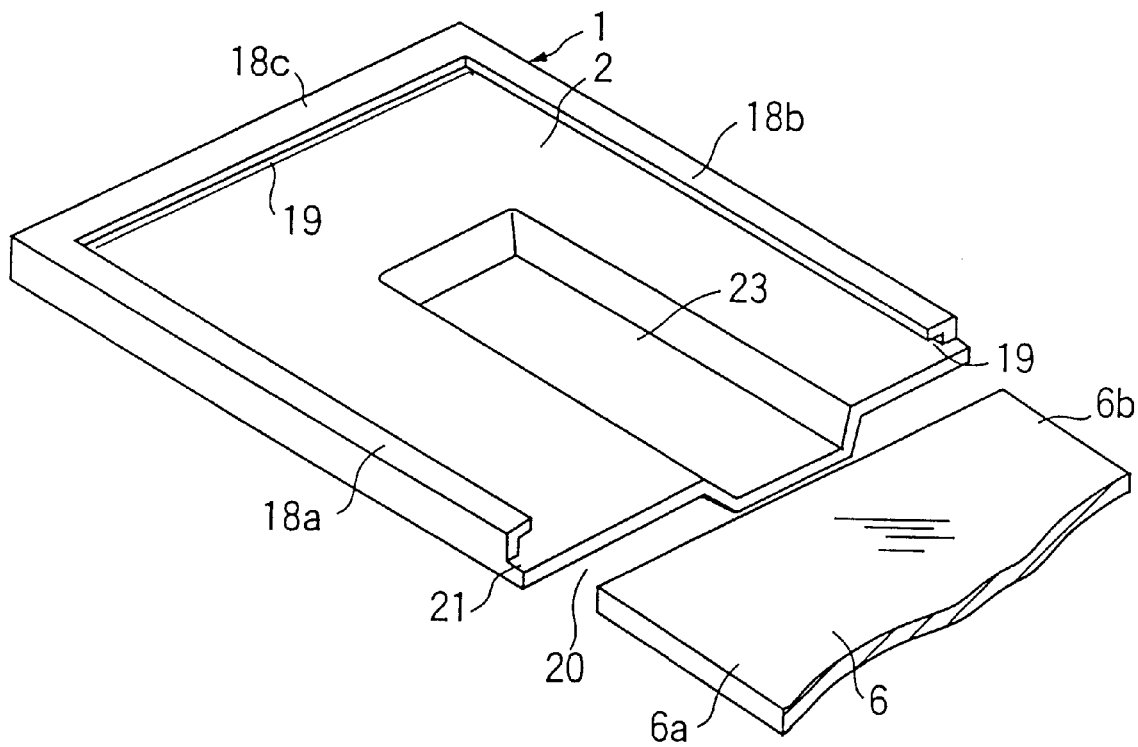
FIG. 8 is a perspective view showing a modification to a tile body according to the second embodiment.

FIG. 8 shows a modification to the second embodiment. In the second embodiment, the escape section 22 for the terminal box is opened in the recess 2 of the tile body 1. In the modification, an escape section 23 for the terminal box having a recess groove that is formed continuously from the inserting section 20 is formed in the recess 2, and a means for mounting the photovoltaic cell module 6 on the tile body 1 is the same as that of the second embodiment.

According to the first and second embodiments described above, a high-reliability tile for a photovoltaic cell module in which the end portion of the photovoltaic cell module is inserted into the fitting section to store the photovoltaic cell module in the recess, the photovoltaic cell module is detachably fixed to a tile body and one photovoltaic cell module can easily be replaced when it is broken, and the photovoltaic cell module can easily and reliably fixed to the tile body.

Since, moreover, the photovoltaic cell module is inserted from the inserting section in the recess of the tile body, the three sides of the photovoltaic cell module are fitted to the fitting section of the tile body and can be fixed to the tile body, and the photovoltaic cell module can be fixed more reliably.

Figure 9:
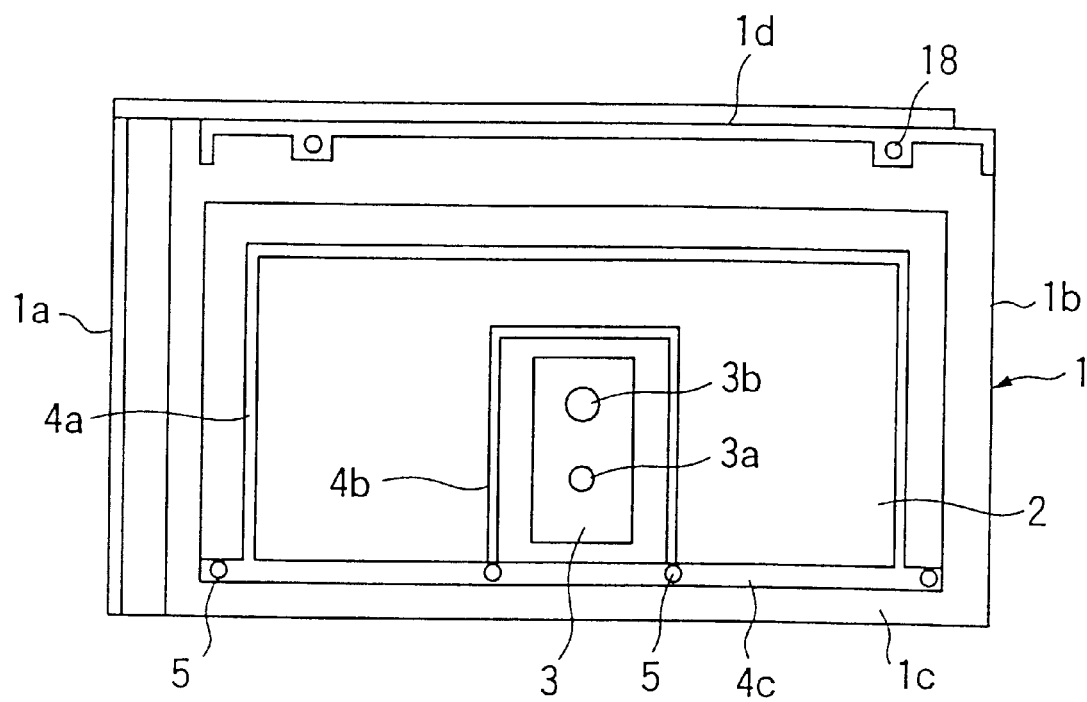
FIG. 9 is a plan view of a tile body according to a third embodiment of the invention.
Figure 10:
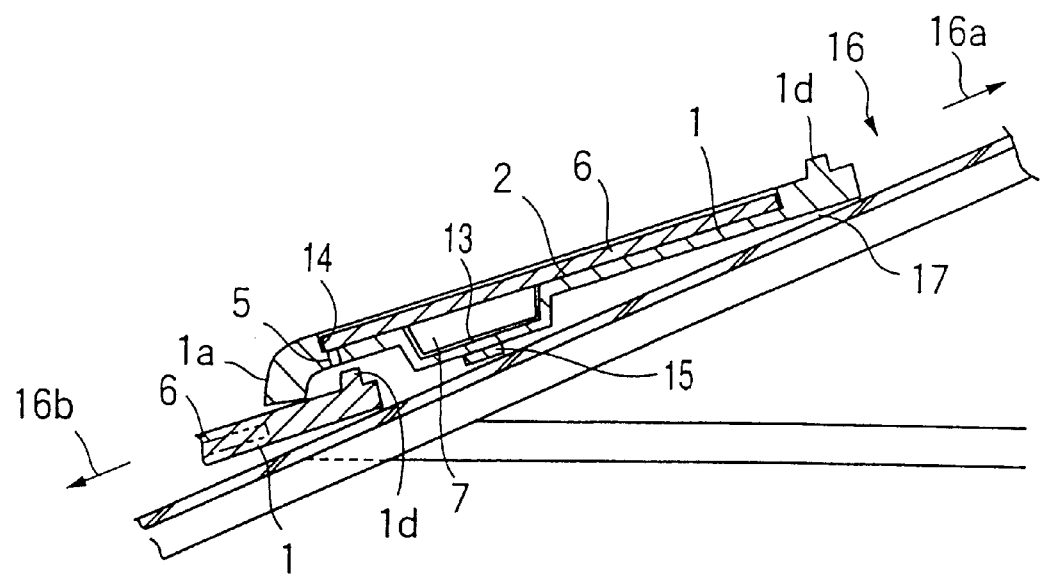
FIG. 10 is a vertical side view showing a tiling state of a photovoltaic cell module tile according to the third embodiment.
Figure 11:
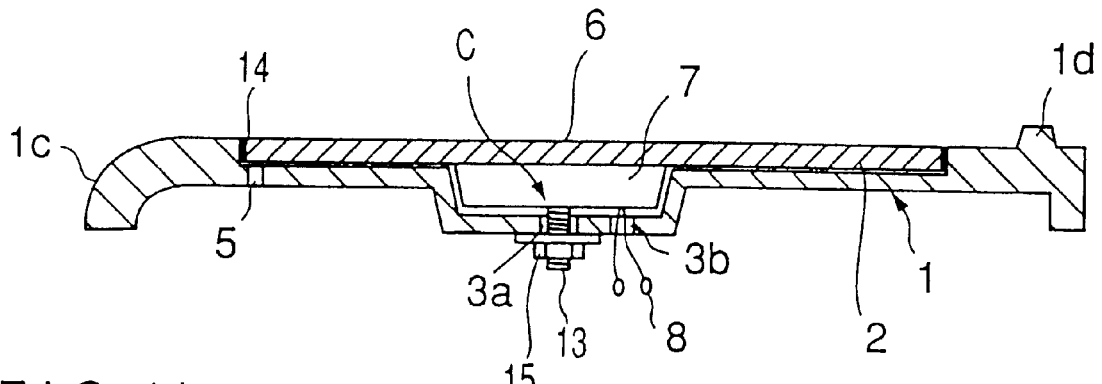
FIG. 11 is a vertical side view of the photovoltaic cell module tile according to the third embodiment.
Figure 12:
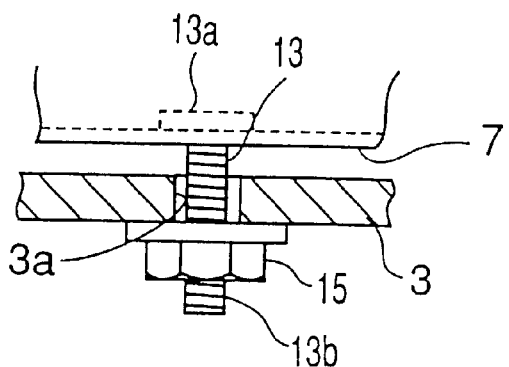
FIG. 12 is an enlarged cross-sectional view of portion C of FIG. 11.

FIGS. 9 to 12 illustrate a third embodiment. FIG. 9 is a plan view of a tile body, FIG. 10 is a vertical side view showing a tiling state of a photovoltaic cell module tile according to the third embodiment, FIG. 11 is a vertical side view of the photovoltaic cell module tile, and FIG. 12 is an enlarged cross-sectional view of portion C of FIG. 11.

As illustrated in FIG. 9, a through hole 3a is formed in substantially the central part of the bottom of the recess 2 of the tile body 1, and a cable leadout hole 3b is formed in a position biased toward the upper end portion of the tile body 1.

As shown in FIGS. 10 and 11, the terminal box 7 is fixed to substantially the central part of the undersurface of the photovoltaic cell module 6, and the output producing cable 8 is connected to the terminal box 7. The terminal box 7 is stored in the terminal-box storing recess 3 of the tile body 1, and the output producing cable 8 is lead to the undersurface of the tile body 1 from the cable lead-out hole 3b.

Furthermore, a head portion 13a of a bolt 13 forming a tightening member as a fixing member is fixed to substantially the central part of the bottom of the terminal box 7, and a screw portion 13b thereof penetrates the bottom of the terminal box 7 and projects downward. When the terminal box 7 is made of synthetic resin, the head portion 13a of the bolt 13 is fixed to the bottom of the terminal box 7 by an adhesive. When it is made of metal, the head portion 13b is fixed to the bottom of the terminal box 7 by welding or an adhesive.

Then, the photovoltaic cell module 6 is fixed in the recess 2 of the tile body 1 as illustrated in FIGS. 11 and 12. In other words, when the photovoltaic cell module 6 is put into the recess 2 of the tile body 1, the terminal box 7 is stored in the terminal-box storing recess 3, and the bolt 13 is inserted in the through hole 3a and at the same time the undersurface of the photovoltaic cell module 6 is brought into close contact with the top surface of the recess 2. Then, rainwater or the like can be prevented from entering the recess 2 by interposing packing 14 made of rubber or synthetic resin between the inner surface of the recess 2 and the outer surface of the photovoltaic cell module 6.

When a nut 15 forming the tightening member is screwed against the screw portion 13b of the bolt 13 that protrudes from under the terminal-box storing recess 3, the terminal box 7 is drawn downward through the bolt 13, and the undersurface of the photovoltaic cell module 6 is brought into close contact with the recess 2 through the terminal box 7, with the result that the photovoltaic cell module 6 is fixed to the tile body 1.

In the present embodiment, a single bolt 13 is protruded from the terminal box 7. However, a plurality of bolts can be protruded from the terminal box 7 and a plurality of through holes corresponding thereto can be formed and fixed to the bottom of the terminal-box storing recess 3. Further, the photovoltaic cell module 6 is fixed at one portion of the terminal box 7 provided in substantially the central part thereof. The outer region of the photovoltaic cell module can be prevented from rising by adhering the undersurface of the edge portion of the photovoltaic cell module 6 and the top surface of the recess 2 to each other by double-faced tape.

According to the present embodiment, the photovoltaic cell module 6 can be fixed into the recess 2 of the tile body 1 by the bolt 13 and the nut 15 and, unlike in the prior art, the photovoltaic cell module 6 need not be fixed to the tile body 1 by an adhesive. Therefore, an operation of fixing the photovoltaic cell module 6 to the tile body 1 is facilitated and the possibility that the photovoltaic cell module 6 is peeled and dropped from the tile body 1 due to degradation in adhesive is eliminated.

Moreover, the following advantage can be obtained by fixing the photovoltaic cell module 6 to the tile body 1 without using any adhesive. When one or some of a number of photovoltaic cell modules 6 laid on the roof 16 is broken and needs to be replaced, the nut 15 that fixes the photovoltaic cell module 6 is loosen, thereby detaching the photovoltaic cell module 6 from the tile body 1 and replacing it with a new photovoltaic cell module 6.

Figure 13:
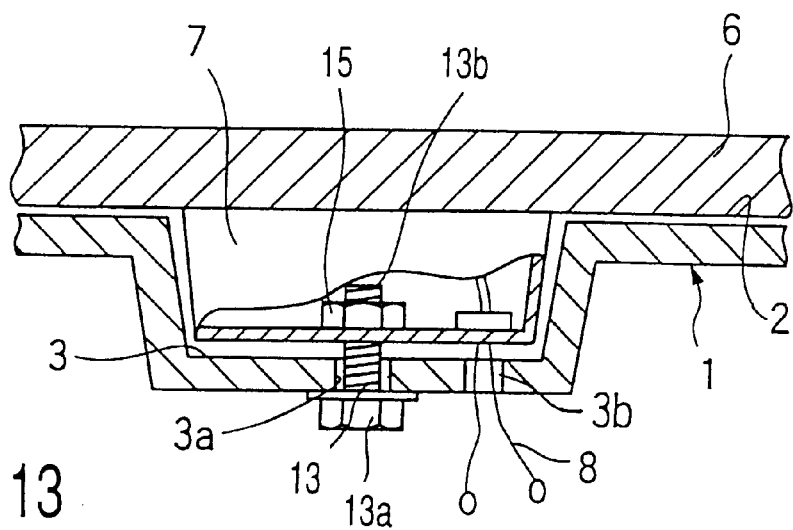
FIG. 13 is a vertical side view of a main portion of a photovoltaic cell module tile according to a fourth embodiment of the invention.

FIG. 13 illustrates a fourth embodiment, and the same components as those of the third embodiment are indicated by the same numbers and their descriptions are omitted. In the fourth embodiment, a nut 15 forming a tightening member as a fixing member is fixed in substantially the central part of the bottom of the terminal box 7. When the terminal box 7 is made of synthetic resin, the nut 15 is fixed to the bottom of the terminal box 7 by an adhesive. When it is made of metal, the nut 15 is fixed to the bottom of the terminal box 7 by welding or an adhesive.

When the photovoltaic cell module 6 is put into the recess 2 of the tile body 1, the terminal box 7 is stored in the terminal-box storing recess 3 and the nut 15 is opposed to the through hole 3a. At the same time, the undersurface of the photovoltaic cell module 6 is brought into close contact with the top surface of the recess 2.

Then, a bolt 13 forming the tightening member is inserted into the through hole 3a of the terminal-box storing recess 3 and screwed against the nut 15. When the bolt 13 is tightened, the terminal box 7 is drawn downward through the bolt 13, and the undersurface of the photovoltaic cell module 6 is brought into close contact with the recess 2 of the tile body 1 through the terminal box 7, with the result that the photovoltaic cell module 6 is fixed to the tile body 1.

In the present embodiment, too, the terminal box 7 can be fixed to the terminal-box storing recess 3 through a plurality of bolts by fixing a plurality of nuts to the terminal box 7 and forming a plurality of through holes in the bottom of the terminal-box storing recess 3 in correspondence with the nuts. Furthermore, the outer region of the photovoltaic cell module 6 can be prevented from rising by adhering the undersurface of the edge portion of the photovoltaic cell module 6 and the top surface of the recess 2 to each other by double-faced tape.

According to the third embodiment described above, the photovoltaic cell module can be placed on the mounting portion of the tile body, the terminal box of the photovoltaic cell module can be stopped and fixed by a stopping member, and the photovoltaic cell module can detachably be fixed to the tile body with a simple structure. According to the fourth embodiment, the photovoltaic cell module can detachably be fixed to the tile body with a simple structure through a tightening member including bolts and nuts. A high-reliability photovoltaic cell module tile can thus be provided in which a photovoltaic cell module can be reliably fixed to the tile body and simply replaced with a new one when it is broken.

Figure 14:
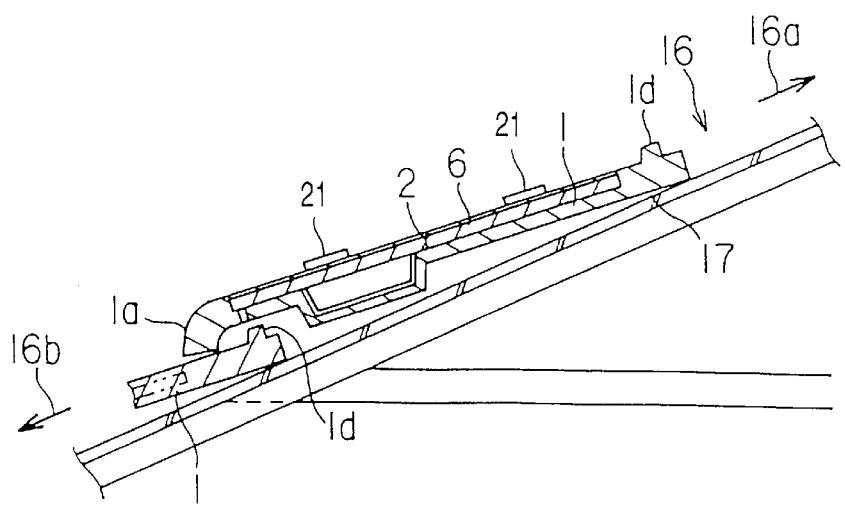
FIG. 14 is a vertical side view of a tiling state of a photovoltaic cell module tile according to a fifth embodiment of the invention.
Figure 15:
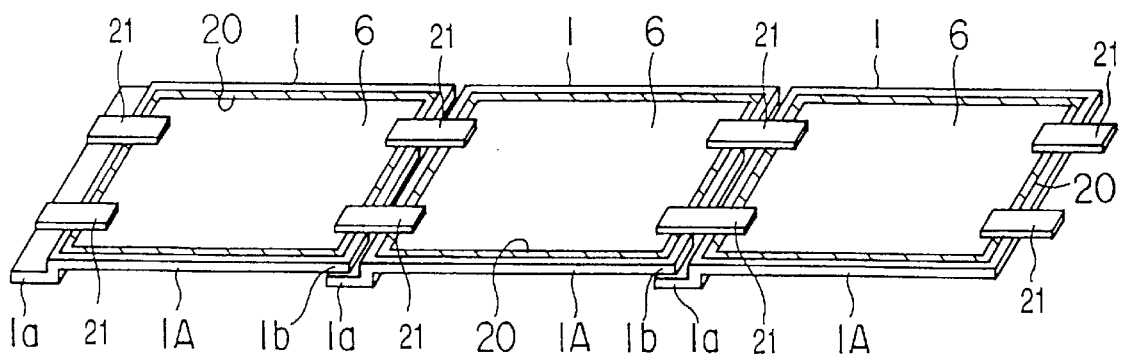
FIG. 15 is a perspective view showing a tiling state of a photovoltaic cell module tile.
Figure 16:
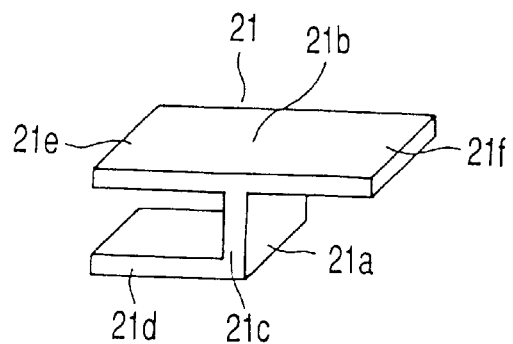
FIG. 16 is a perspective view showing a fixing jig for fixing a photovoltaic cell module on a tile.
Figure 17:
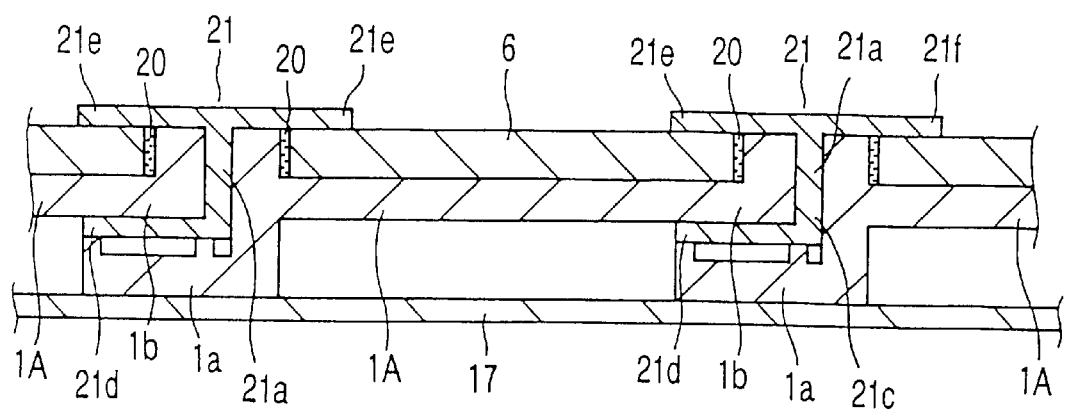
FIG. 17 is a vertical front view showing a photovoltaic cell module fixed by the fixing jig.

FIG. 14 is a vertical side view of a tiling state of a photovoltaic cell module tile according to a fifth embodiment. FIG. 15 is a perspective view showing a tiling state of the photovoltaic cell module. FIG. 16 is a perspective view showing a fixing jig for fixing the photovoltaic cell module to the tile, and FIG. 17 is a vertical front view showing the photovoltaic cell module fixed by the fixing jig.

A fixing jig 21 serving as a fixing member shown in FIG. 16 includes a jig body 21a and a plate-like section 21b formed on the upper end of the jib body 21a horizontally and integrally as one component.

The jig body 21a includes a vertical section 21c and a bottom section 21d and is shaped like a letter L. The plate-like section 21b includes a first pressure piece 21e at one end and a second pressure piece 21f at the other end.

The jig body 21a and plate-like section 21b of the fixing jig 21 are formed integrally as one component by extrusion by aluminum, and the fixing jig can easily be colored such that its color tone can match that of the tile 1.

The forming material of the fixing jig 21 is not limited to aluminum. Metal such as stainless steel and steel and synthetic resin such as FRP, ABS, PVC, CPVC, polyester, nylon, polyisobutene, and EPDM can be used.

A method of fixing the photovoltaic cell module 6 will now be described.

When tiles 1 adjacent from side to side are placed on the roofing board 17 in sequence from right to left, the photovoltaic cell module 6 is fixed using the fixing jig 21.

More specifically, prior to an operation of laying an overlap portion 1b of a left-hand tile body 1A on an overlap portion 1a of a right-hand tile body 1A, the fixing jig 21 is placed on the overlap portion 1a of the right-hand tile body 1A, as illustrated in FIG. 17. Then, the overlap portion 1b of the left-hand tile body 1A is inserted in between a holding piece 21d of the jig body 21a of the fixing jig 21 and the first pressure piece 21e and laid on the overlap portion 1a of the right-hand tile body 1A.

Thus, the jig body 21a of the fixing jig 21 is held between the tile bodies 1A and 1A adjacent from side to side, and the top surfaces of right and left photovoltaic cell modules 6 and 6 are pressed and held by the first and second pressure pieces 21e and 21f, with the result that the photovoltaic cell module is fixed in the recess 2 of the tile body 1A.

Resin is supplied between the inner surface of the recess 2 of the tile body 1 and the outer surface of the photovoltaic cell module 6 and a water-cutoff seal 20 is applied therebetween.

As described above, since the photovoltaic cell module 6 is fixed to the tile body 1A by the fixing jig 21, the fixing force can be maintained satisfactorily for a longer time than the technique of fixing a photovoltaic cell module and a tile to each other by an adhesive as disclosed in Jpn. UM Appln. KOKAI Publication No. 4-28524. It is thus possible to prevent the photovoltaic cell module 6 from dropping from the tile body 1A.

In the fifth embodiment, the photovoltaic cell module 6 is fixed using four fixing jigs 21, as shown in FIG. 15. The present invention is not limited to this. The central part of either side of the photovoltaic cell module 6 can be fixed using one fixing jig 21. Moreover, the photovoltaic cell module 6 can be fixed into the recess 2 of the tile body 1A using both the fixing jig 21 and an adhesive.

Figure 18:
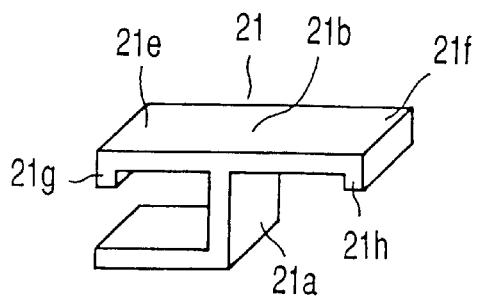
FIG. 18 is a perspective view showing a first modification of the fixing jig.

FIG. 18 is a perspective view showing a first modification to the fixing jig.

The fixing jig 21 includes first and second holding pieces 21e and 21f. Projections 21g and 21h are projected downward from their respective ends of the first and second holding pieces 21e and 21f.

The photovoltaic cell module 6 can be pressed and held strongly by projections 21a and 21b of the first and second pressure pieces 21e and 21f of the fixing jig 21. The photovoltaic cell module 6 can thus be fixed more reliably.

Figure 19:
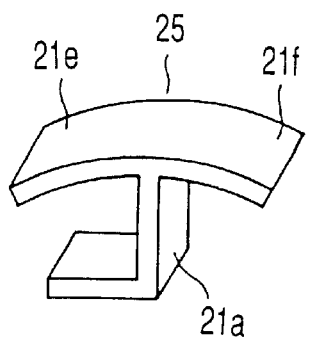
FIG. 19 is a perspective view showing a second modification of the fixing jig.

FIG. 19 is a perspective view showing a second modification to the fixing jig. A fixing jig 25 includes first and second pressure pieces 21e and 21f that are curved.

With the fixing jig 25, the photovoltaic cell module 6 can be pressed and held strongly by an end portion of each of the first and second pressure pieces 21e and 21f and thus fixed more reliably.

Figure 20:
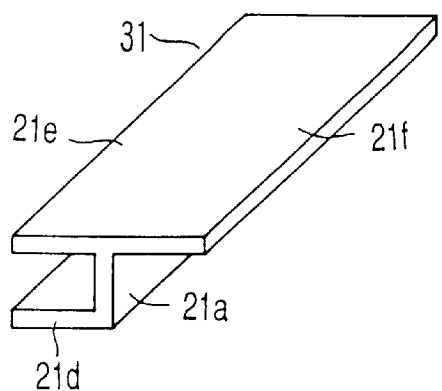
FIG. 20 is a perspective view showing a third modification of the fixing jig.

FIG. 20 is a perspective view showing a third modification to the fixing jig. A fixing jig 31 has substantially the same length as that of the side of the tile 1.

Figure 21:
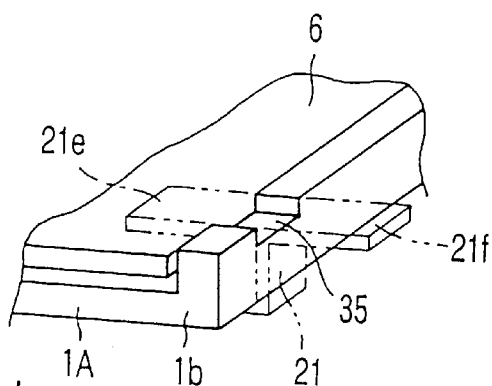
FIG. 21 is a perspective view showing a mounting structure of a fixing jig according to a sixth embodiment of the invention.

FIG. 21 is a perspective view showing a sixth embodiment in which a photovoltaic cell module is fixed to a tile body.

In the sixth embodiment, a groove section 35 is formed in the top surface of an overlap portion 1b of the tile body 1A, and a first pressure piece 21e of a fixing jig 21 is fitted into the groove section 35.

According to the sixth embodiment, the fixing jig 21 can be positioned and reliably held in a given position by controlling its up-and-down movements.

Figure 22:
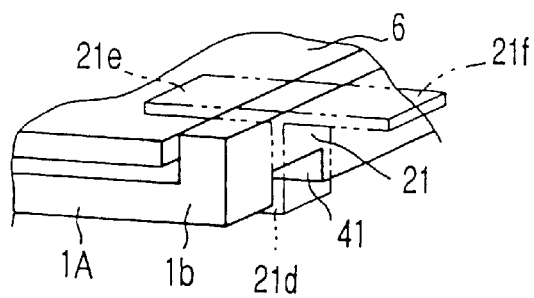
FIG. 22 is a perspective view showing a mounting structure of a fixing jig according to a seventh embodiment of the invention.

FIG. 22 is a perspective view showing a seventh embodiment in which a photovoltaic cell module is fixed to a tile body.

In the seventh embodiment, a groove section 41 is formed in the undersurface of an overlap portion 1b of the tile body 1A, and a bottom surface 21d of a fixing jig 21 is fitted into the groove section 41.

According to the seventh embodiment, the fixing jig 21 can be positioned and reliably held in a given position by controlling its up-and-down movements.

Figure 23:
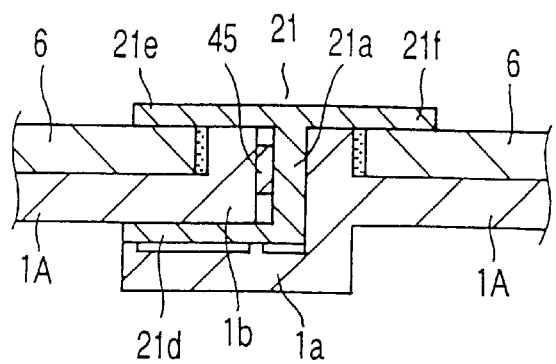
FIG. 23 is a vertical front view showing a mounting structure of a fixing jig according to an eighth embodiment of the invention.

FIG. 23 is a cross-sectional view showing an eighth embodiment in which a photovoltaic cell module is fixed to a tile body.

In the eighth embodiment, double-faced tape 45 is adhered as an adhesive to a jig body 21a of a fixing jig 21 and to the side of an overlap portion 1a of the tile body 1A arranged on the left side, with the result that the fixing jig 21 can reliably be held in a given position by controlling its up-and-down movements.

Figure 24:
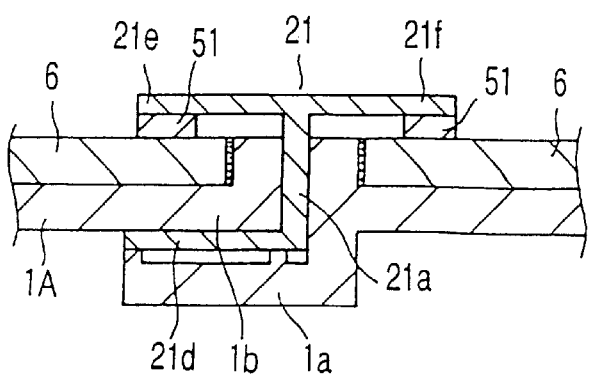
FIG. 24 is a vertical front view showing a mounting structure of a fixing jig according to a ninth embodiment of the invention.

FIG. 24 is a cross-sectional view showing a ninth embodiment in which a photovoltaic cell module is fixed to a tile body.

In the ninth embodiment, an elastic member 51 such as sponge and packing having flexibility is attached to the backside of each of first and second pressure pieces 21e and 21f of the fixing jig 21, and the photovoltaic cell module 6 is pressed and held through the elastic members 51 and 51. The present invention is not limited to the elastic member 51. It is desirable to use a material having heat insulating properties that make it harder to directly transmit heat of the fixing jig 21 to the glass surface of the photovoltaic cell module.

So-called plastic is provided as a material having such heat insulating properties. Since the hardness of plastic is lower than that of glass, the glass surface is not damaged. It is thus desirable to use the plastic.

Commonly-known plastic can be used; however, FRP, ABS, PVC, CPVC, polyethylene, polypropylene, styrene, nylon, polyester, EPDM, polyisobutene, etc. can be exemplified. These plastic materials can be used as any one of hard, soft, and foaming materials.

According to the ninth embodiment, the metal-made first and second pressure pieces 21e and 21f and the glass-made photovoltaic cell module 6 can be prevented from directly contacting each other and thus the photovoltaic cell module 6 can be prevented from being broken by heat.

When the fixing jig is made of synthetic resin materials, the glass surface can be prevented from being damaged or broken by heat. A forming process for forming the fixing jig is easy and desirable. It is also desirable to perform a process such as coating.

According to the forgoing fifth to ninth embodiments, the jig body is interposed between adjacent tiles in the horizontal direction, and the photovoltaic cell modules of adjacent tiles are pressed and held by the first and second pressure pieces formed at the upper end portion of the jig body such that they are integrated with each other. The fixing force can thus be maintained for a longer time than using an adhesive as in the prior art.

Consequently, the following advantages can be obtained. Even though the photovoltaic cell module is exposed to sunlight and the weather, it can reliably be fixed to the tile, and the photovoltaic cell module can be prevented from dropping from the tile, thus improving in safety.

Figure 25:
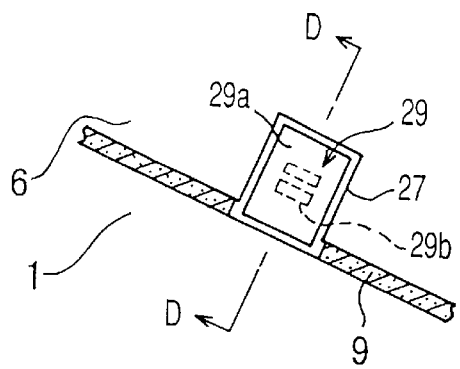
FIG. 25 is a plan view showing part of a photovoltaic cell module tile according to a tenth embodiment of the invention.
Figure 26:
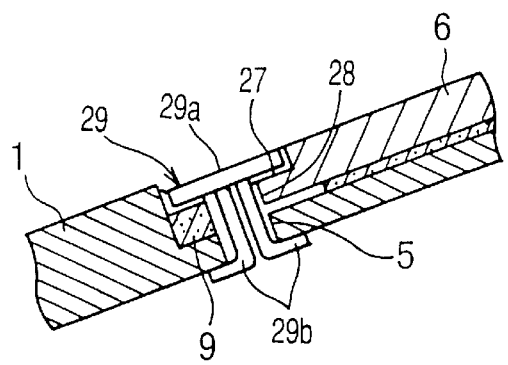
FIG. 26 is a cross-sectional view taken along line D—D of FIG. 25.

FIGS. 25 and 26 illustrate a tenth embodiment, and the same components as those of the first embodiment are indicated by the same numbers and their descriptions are omitted. FIG. 25 is a plan view showing part of a photovoltaic cell module tile, and FIG. 26 is a cross-sectional view taken along line D—D of FIG. 25. A notch portion 27 is provided at a lower edge portion of the photovoltaic cell module 6 and a portion corresponding to one or plural drain holes 5 of the tile body 1. A through hole 28, which penetrates the lower edge portion of the photovoltaic cell module 6 and is opposed to the drain hole 5, is formed in the bottom of the notch portion 27.

A fixing member 29 of a split-pin structure having a head portion 29a whose shape conforms to that of the notch portion 27 is inserted into the through hole 28. A leg portion 29b of the fixing member 29 penetrates the drain hole 5 and is bent toward the backside of the tile body 1, with the result that the photovoltaic cell module 6 is fixed to the tile body 1. This structure allows the photovoltaic cell module 6 to be fixed to the tile body 1 more reliably and allows an adhesive to be omitted or saved.

The fixing jig 29 is inserted using the drain hole 5; however, a dedicated mounting hole can be formed in the tile body 1. The fixing member 29 is not limited to the split-pin structure but can be replaced with a bolt and a nut. The notch portion 27 need not be always required.

According to the foregoing tenth embodiment, the photovoltaic cell module can reliably be fixed to the tile body by the fixing jig using the drain hole.

Figure 28:
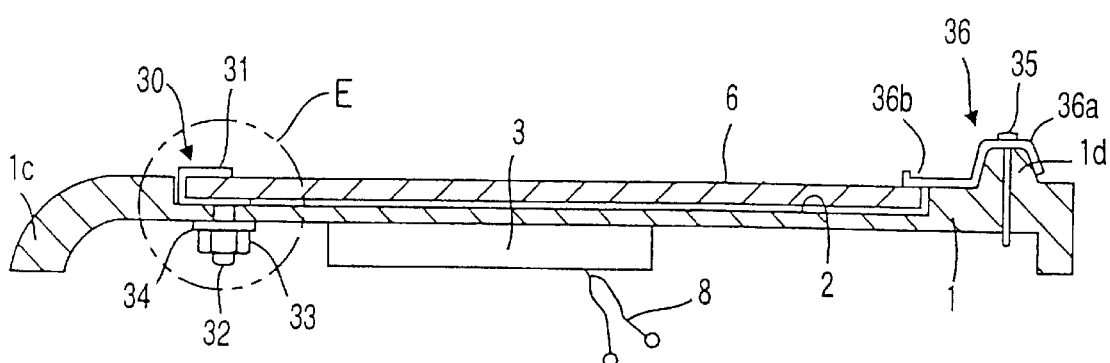
FIG. 28 is a vertical side view of the photovoltaic cell module tile according to the eleventh embodiment.
Figure 29:
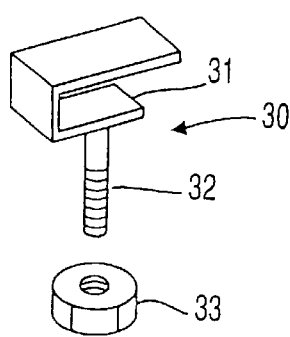
FIG. 29 is a perspective view of a fixing member according to the eleventh embodiment.
Figure 30:
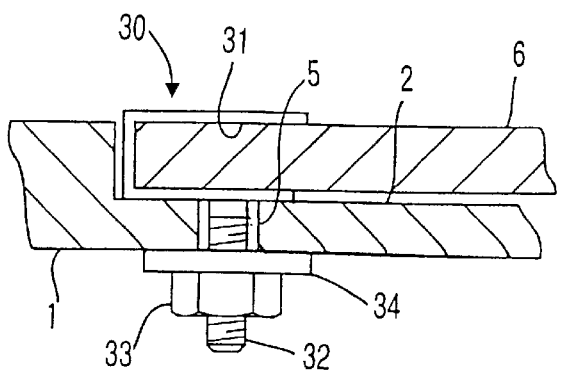
FIG. 30 is an enlarged cross-sectional view of portion E of FIG. 28.
Figure 27:
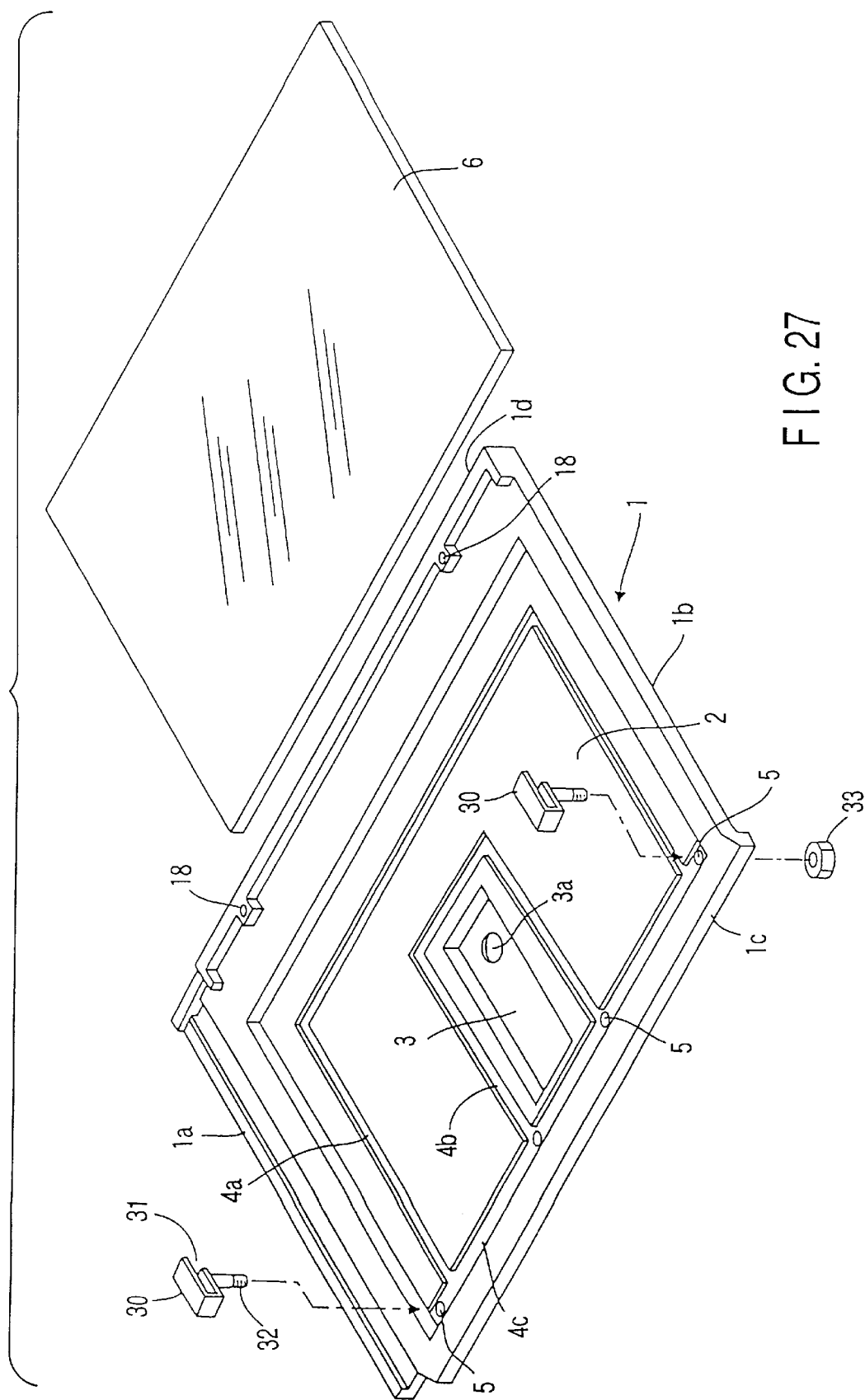
FIG. 27 is an exploded perspective view of a photovoltaic cell module tile according to an eleventh embodiment of the invention.

FIGS. 27 to 30 illustrate an eleventh embodiment. FIG. 27 is an exploded perspective view of a photovoltaic cell module tile, FIG. 28 is a vertical side view of the photovoltaic cell module tile, FIG. 29 is a perspective view of a fixing member, and FIG. 30 is an enlarged cross-sectional view of portion E in FIG. 28.

The tile body 1 is the same as that of the first embodiment, and the same components are denoted by the same numbers and their descriptions are omitted. The photovoltaic cell module 6 held in recess 2 of the tile body 1 is fixed in the recess 2 of the tile body 1 by a fixing member 30 shown in FIGS. 27 to 30. The fixing member 30 is formed by bending, e.g., a metal plate like a Japanese letter "コ" and includes a fitting section 31 that can be fitted to the lower end portion of the photovoltaic cell module 6, a bolt 32 that is fixed to the undersurface of the fitting section 31 by welding or the like and that is insertable into the drain hole 5 of the tile body 1, and a nut 33 which is screwed on the bolt 32.

The fixing member 30 is arranged at each of right and left end portions of the lower end portion (eaves side) of the photovoltaic cell module 6 while its fitting section 31 is fitted to the module 6. The bolt 32 is inserted into the drain hole 5 of the tile body 1. The bolt 32 is projected from the undersurface of the tile body 1, and the nut 33 is screwed on the bolt 32 through a washer 34 on the undersurface of the tile body 1. When the nut 33 is tightened, the photovoltaic cell module 6 is fixed to the tile body 1 by the fixing member 30.

The upper end portion (ridge side) of the photovoltaic cell module 6 is fixed by a pressure metal fitting 36 fixed to the rear rising portion 1d of the tile body 1 by a tile fixing nail 35. In other words, the pressure metal fitting 36 includes a fitting portion 36a fitted to the top of the rear rising portion 1d of the tile body 1 and a pressing portion 36b extending downward together with the fitting portion 36a, and the pressing portion 36b presses and fixes the upper end portion of the photovoltaic cell module 6 against the tile body 1.

According to the eleventh embodiment, the fixing member 30 allows the photovoltaic cell module 6 to be closely fixed to the tile body 1. However, the photovoltaic cell module 6 can be fixed to the tile body 1 using an adhesive as in the prior art. Consequently, an operation of fixing the photovoltaic cell module 6 to the tile body 1 is facilitated and the possibility that the photovoltaic cell module 6 is peeled and dropped from the tile body 1 due to degradation in adhesive is eliminated.

Moreover, the photovoltaic cell module 6 is fitted and fixed to the tile body 1 by the fixing member 30 without using any adhesive. Therefore, when one or some of a number of photovoltaic cell modules 6 laid on the roof is broken and needs to be replaced, the nut 33 of the fixing member 30 that fixes the photovoltaic cell module 6 is loosened, thereby detaching the photovoltaic cell module 6 from the tile body 1 and replacing it with a new photovoltaic cell module 6. The photovoltaic cell module can be replaced more easily than the case where a photovoltaic cell module is fixed by an adhesive. The photovoltaic cell module of this embodiment is desirable.

There is an advantage that a through hole need not be formed on purpose because the bolt 32 of the fixing member 30 penetrates the tile body 1 through the drain hole 5. However, the present invention is not limited to the insertion of the bolt 32 into the drain hole 5, but a through hole exclusively for the fixing member 30 can be formed in the tile body 1.

Figure 31:
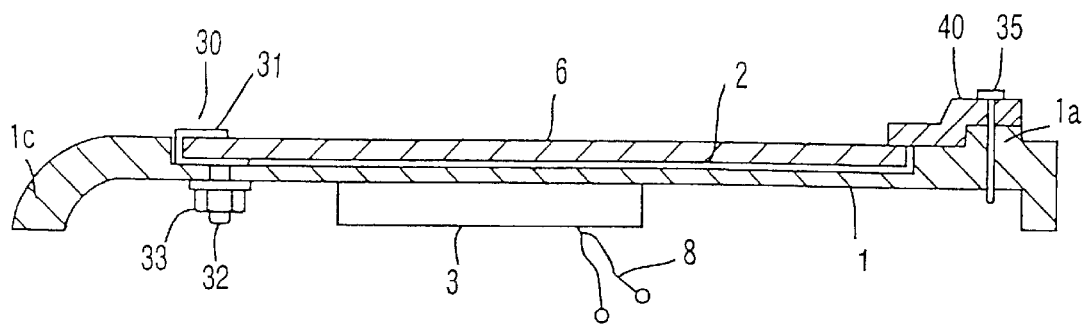
FIG. 31 is a vertical side view of a photovoltaic cell module tile according to a twelfth embodiment of the invention.

FIG. 31 illustrates a twelfth embodiment, and the same components as those of the first and eleventh embodiments are indicated by the same numbers and their descriptions are omitted. In the twelfth embodiment, a pressure member 40 for pressing and fixing the upper end portion of the photovoltaic cell module 6 to the tile body 1 is formed of the same material as that of the tile body 1. In other words, a tile includes two pieces of the tile body 1 and the pressure member 40, and the upper end portion of the photovoltaic cell module 6 can be pressed and fixed to the tile body 1 by fixing the pressure member 40 by a tile fixing nail 35 as in the eleventh embodiment.

Figure 32:
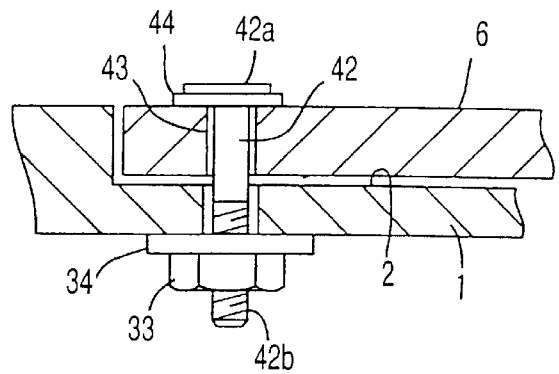
FIG. 32 is a vertical side view showing part of a photovoltaic cell module tile according to a thirteenth embodiment of the invention.

FIG. 32 illustrates a thirteenth embodiment, and the same components as those of the first and eleventh embodiments are indicated by the same numbers and their descriptions are omitted. In the thirteenth embodiment, a bolt 42 is formed as a fixing member for fixing the lower end portion of the photovoltaic cell module 6 to the tile body 1. The bolt 42 includes a head portion 42a and a screw portion 42b.

On the other hand, a mounting hole 43 is formed in the lower end portion of the photovoltaic cell module 6 as a through portion into which the bolt 42 is inserted. The bolt 42 is inserted into the mounting hole 43 from the top surface side of the photovoltaic cell module 6 and passes through the drain hole 5 of the tile body 1. The bolt 42 is protruded from the undersurface of the tile body 1, and the nut 33 is screwed on the bolt 42 through the washer 34 on the undersurface of the tile body 1. When the nut 33 is tightened, the photovoltaic cell module 6 is fixed to the tile body 1 by the bolt 42. A packing 44 such as rubber is interposed between the head portion 42a of the bolt 42 and the top surface of the photovoltaic cell module 6 as a cushion in order to prevent the photovoltaic cell module 6 from being broken due to the tightening force of the nut 33.

The thirteenth embodiment has the advantage that since the fixing member for fixing the photovoltaic cell module 6 is the bolt 42, it can be configured simply and provided inexpensively. The through portion of the photovoltaic cell module 6 is not limited to the mounting hole 43, but the lower end portion of the photovoltaic cell module 6 can be provided with a Japanese-letter-⊐-shaped or U-shaped notch portion in which the bolt 42 is fitted.

Figure 33:
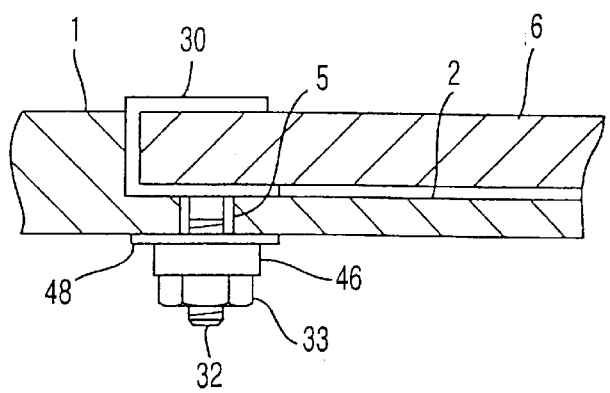
FIG. 33 is a vertical side view showing part of a photovoltaic cell module tile according to a fourteenth embodiment of the invention.
Figure 34:
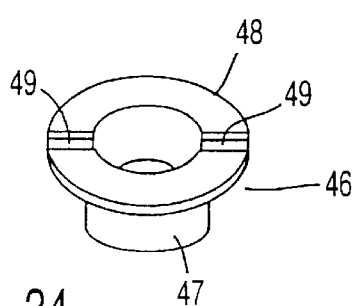
FIG. 34 is a perspective view of a washer according to the fourteenth embodiment.

FIGS. 33 and 34 illustrate a fourteenth embodiment, and the same components as those of the first and eleventh embodiments are indicated by the same numbers and their descriptions are omitted. In the fourteenth embodiment, a washer 46 is used for the fixing member 30 for fixing the lower end portion of the photovoltaic cell module 6 to the tile body 1. The washer 46 includes a cylindrical section 47 having a bottom and a flange portion 48 that is formed at the edge of the opening of the cylindrical section 47 integrally with each other. An insertion hole (not shown) is formed in the bottom of the cylindrical section 47 to insert the bolt 32 thereinto. Drain grooves 49 are formed radially in the top surface of the flange portion 48.

The fourteenth embodiment resolves the problem that when the bolts 32 of the fixing members 30 are inserted into all the drain holes 5 of the tile body 1, the drain holes 5 are blocked to make it impossible to drain rainwater and the like from the recess 2. The fourteenth embodiment has the advantage that rainwater and the like flowing from the recess 2 into the drain holes 5 is drained along the drains 48 formed in the flange section 47 of the washer 46. The material of the fixing member 30 is not limited to metal, but plastic can be used for the fixing member.

Figure 35:
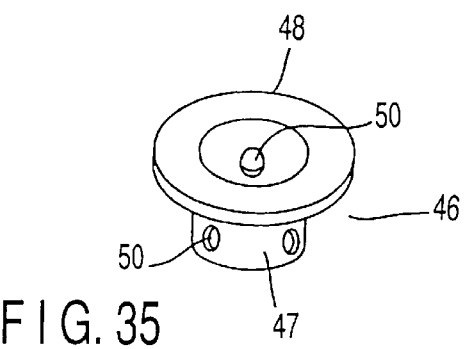
FIG. 35 is a perspective view showing a modification to the washer according to the fourteenth embodiment.

FIG. 35 shows a modification to the fourteenth embodiment. A plurality of drain holes 50 are formed in the side wall of the cylindrical section 47 of the washer 46. The modification has the advantage that rainwater and the like flowing from the recess 2 into the drain holes 5 is drained from the drain holes 50 of the cylindrical section 47 of the washer 46.

The fixing member of this invention is used to fix a photovoltaic cell module on the top surface of a tile to the tile. A stopping section is formed at one end of the fixing member that protrudes from the undersurface of the tile to prevent a fixing metal fitting from being detached from the through hole. The stopping can be performed by tightening a nut, bending a spring structure, a pin structure and a fixing metal fitting, or the like. The tightening of a nut is the most desirable.

According to the twelfth to fourteenth embodiments described above, the photovoltaic cell module is pressed into the recess of the tile body by the mechanically stopping section of the fixing member, with the result that the photovoltaic cell module can closely be fixed to the tile body. Consequently, the photovoltaic cell module can be attached to and detached from the tile body. When one photovoltaic cell module is broken, it can easily be replaced with a new one. A high-reliability photovoltaic cell module tile capable of firmly fixing the photovoltaic cell module to the tile body can be provided.

The above embodiments have an advantage that the ridge side of the photovoltaic cell module can be fixed to the tile body at the same time when the ridge side of the tile body is fixed to the roofing material. The embodiments have another advantage that the photovoltaic cell module can exactly be fixed to the tile body using the drain holes and a new process need not be applied to the tile body.

As described above, according to the present invention, there can be provided a high-reliability photovoltaic cell module tile in which an end portion of a photovoltaic cell module is inserted into a fitting section of the tile body, and the photovoltaic cell module is held in the recess, the photovoltaic cell module can be attached to and detached from the tile body, the photovoltaic cell module can be replaced when it is broken, and the photovoltaic cell module can be easily and simply fixed to the tile body.

As described above, the photovoltaic cell module tile according to the present invention is used as roofing material of a building and a photovoltaic cell module is mounted on the tile, thereby converting solar energy into electricity.

What is claimed is:

1. A photovoltaic cell module tile comprising:
   a tile body;
   a recess provided in a top surface of the tile body, which stores a photovoltaic cell module;
   a fitting section which is provided in the recess on an eaves side of the tile body and in which an eaves-side end portion of the photovoltaic cell module is inserted and fitted; and
   a pressure member which is provided on a ridge side of the tile body and presses a ridge-side end portion of the photovoltaic cell module against the tile body.

2. The photovoltaic cell module tile according to claim 1, wherein the photovoltaic cell module is of a plate shape, the fitting section is provided on each of three sides of the recess of the tile body, and an inserting section for inserting the photovoltaic cell module is provided on a remaining one side of the recess.

3. The photovoltaic cell module tile according to claim 2, wherein an escape section is provided in the recess of the tile body continuously from the inserting section to house a terminal box provided in the photovoltaic cell module of the plate shape when the photovoltaic cell module is inserted and fitted into the fitting section.

4. A photovoltaic cell module tile comprising:
   a tile body;
   a mounting section provided on the tile body, which mounts a photovoltaic cell module having a terminal box on an undersurface of the photovoltaic cell module; and
   a tightening member provided in the terminal box, which penetrates the mounting section of the tile body and fixes the photovoltaic cell module to the tile body from under the mounting section, the tightening member having a nut and a bolt.

5. The photovoltaic cell module tile according to claim 4, wherein the bolt protrudes downward from the terminal box and penetrates the mounting section, and the nut is screwed on the bolt under the mounting section.

6. The photovoltaic cell module tile according to claim 4, wherein the nut is provided in the terminal box, and the bolt penetrates the mounting section from below and is screwed into the nut.

7. The photovoltaic cell module tile according to claim 4, wherein part of the tightening member is fitted into a groove formed in the tile body to position and hold the tightening member.

8. The photovoltaic cell module tile according to claim 4, wherein the tightening member is fixed to the tile body by an adhesive or by welding.

9. The photovoltaic cell module tile according to claim 4, wherein the tightening member has a fitting section above and a stopping section below, the fitting section being fitted to the photovoltaic cell module and the stopping section mechanically stopping the tile body on the undersurface of the tile body.

10. The photovoltaic cell module tile according to claim 4, wherein the tightening member has a fitting section which is provided on the tile body and fitted to an eaves-side end portion of the photovoltaic cell module.

11. The photovoltaic cell module tile according to claim 4, wherein the tightening member has a fitting section which is provided on the tile body and penetrates a through portion formed in the photovoltaic cell module.

12. The photovoltaic cell module tile according to claim 4, wherein the tile body has a penetrating hole which serves as a drain outlet and also as a through hole through which the tightening member passes.

13. A photovoltaic cell module tile comprising:
    a tile body;
    a mounting section provided on the tile body, which mounts a photovoltaic cell module having a terminal box on an undersurface of the photovoltaic cell module; and
    a tightening member for fixing the photovoltaic cell module to the tile body and having a fixing member body interposed between adjacent tile bodies of a plurality of tile bodies arranged in a row, a pressure piece which is formed on an upper end portion of the fixing member body to be integral with the fixing member body and presses photovoltaic cell modules of adjacent tile bodies against the tile bodies, and a holding piece which is formed on a lower end portion of the fixing member body to be integral with the fixing member body and holds under the tile body.

14. A photovoltaic cell module tile comprising:
    a tile body;
    a mounting section provided on the tile body, which mounts a photovoltaic cell module having a terminal box on an undersurface of the photovoltaic cell module; and
    a tightening member for fixing the photovoltaic cell module to the tile body and having a fixing member body interposed between adjacent ones of a plurality of tile bodies arranged in a row, a pair of left and right pressure pieces which are formed on an upper end portion of the fixing member body to be integral with the fixing member body and are each connected to a top surface of the photovoltaic cell module mounted on a corresponding one of the plurality of tile bodies to press the photovoltaic cell module against the tile body, and a holding piece which is formed on a lower end portion of the fixing member body to be integral with the fixing member body and holds, together with the pair of pressure pieces, the tile body.

15. The photovoltaic cell module tile according to claim 13, wherein the pressure piece is provided with a projection portion at an edge portion of the pressure piece, and the projection portion extends downwardly so as to be connected to a top surface of the photovoltaic cell module.

16. The photovoltaic cell module tile according to claim 13, wherein the pressure piece is bent downwardly in an arc shape so as to be connected resiliently to a top surface of the photovoltaic cell module.

17. The photovoltaic cell module tile according to claim 13, wherein the pressure piece has approximately the same length as a side edge portion of the tile body.

18. The photovoltaic cell module tile according to claim 13, wherein the pressure piece is engaged with a groove in a top surface of a side edge portion of the tile body.

19. The photovoltaic cell module tile according to claim 13, wherein upper and lower grooves are provided in top and bottom surfaces, respectively, of a side edge portion of the tile body, and the pressure piece of the fixing member is engaged with the upper groove, while the holding piece of the fixing member is engaged with the lower groove.

20. The photovoltaic cell module tile according to claim 13, wherein a side surface of the fixing member body is adhered to a side surface of a side edge portion of the tile body by a double-faced tape.

21. The photovoltaic cell module tile according to claim 13, wherein the pressure piece has an elastic member on a bottom surface of the pressure piece and the pressure piece is connected to a top surface of the photovoltaic cell module, with the elastic member interposed between the pressure piece and the photovoltaic cell module.

* * * * *